United States Patent
Bergström et al.

(10) Patent No.: US 11,277,232 B2
(45) Date of Patent: Mar. 15, 2022

(54) METHOD AND DEVICES EMPLOYING RETRANSMISSION SCHEMES

(71) Applicant: Telefonaktiebolaget LM Ericsson (publ), Stockholm (SE)

(72) Inventors: Andreas Bergström, Linköping (SE); Erik Eriksson, Linköping (SE); Pål Frenger, Linköping (SE); Cong Shi, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 243 days.

(21) Appl. No.: 15/779,140

(22) PCT Filed: Nov. 28, 2016

(86) PCT No.: PCT/EP2016/079047
§ 371 (c)(1),
(2) Date: May 25, 2018

(87) PCT Pub. No.: WO2017/089617
PCT Pub. Date: Jun. 1, 2017

(65) Prior Publication Data
US 2018/0287746 A1    Oct. 4, 2018

Related U.S. Application Data

(60) Provisional application No. 62/260,371, filed on Nov. 27, 2015.

(51) Int. Cl.
*H04L 1/18*    (2006.01)

(52) U.S. Cl.
CPC .......... *H04L 1/1854* (2013.01); *H04L 1/1812* (2013.01); *H04L 1/1822* (2013.01); *H04L 1/1825* (2013.01)

(58) Field of Classification Search
None
See application file for complete search history.

(56) References Cited

U.S. PATENT DOCUMENTS

| | | | |
|---|---|---|---|
| 7,953,062 B2* | 5/2011 | Sindhushayana | H04L 1/0059 370/345 |
| 10,931,425 B2* | 2/2021 | He | H04L 5/0055 |

(Continued)

FOREIGN PATENT DOCUMENTS

| | | |
|---|---|---|
| CN | 101124762 A | 2/2008 |
| CN | 101843024 A | 9/2010 |

OTHER PUBLICATIONS

Unknown, Author, "Comparison between single and two-layer ARQ for LTE", 3GPP TSG-RAN WG2 #48bis, Tdoc R2-052429, Cannes, France, Oct. 10-14, 2005, 1-5.

*Primary Examiner* — Christopher T Wyllie
(74) *Attorney, Agent, or Firm* — Murphy, Bilak & Homiller, PLLC

(57) ABSTRACT

Methods and devices, particularly radio base station and communication terminal, for controlling a feedback process in a communication between nodes of a communication system, comprising selectively employing one or both of a first feedback process which provides fast feedback and a second feedback process which provides reliable feedback, wherein the first and second feedback processes operate at least partly on the same transmission buffers or queues.

15 Claims, 7 Drawing Sheets

(56) References Cited

U.S. PATENT DOCUMENTS

| | | | | |
|---|---|---|---|---|
| 2002/0172208 A1* | 11/2002 | Malkamaki | H04L 1/1607 | 370/400 |
| 2003/0003905 A1* | 1/2003 | Shvodian | H04W 28/22 | 455/423 |
| 2003/0206521 A1* | 11/2003 | Qiao | H04L 45/00 | 370/230 |
| 2004/0093548 A1* | 5/2004 | Heo | H04L 1/1848 | 714/749 |
| 2005/0047363 A1* | 3/2005 | Jiang | H04W 28/14 | 370/328 |
| 2006/0034274 A1 | 2/2006 | Kakani et al. | | |
| 2006/0034285 A1* | 2/2006 | Pirskanen | H04L 1/1822 | 370/394 |
| 2006/0282739 A1* | 12/2006 | Meyer | H04L 1/1874 | 714/748 |
| 2007/0211670 A1* | 9/2007 | Andersson | H04W 72/1257 | 370/335 |
| 2008/0253334 A1* | 10/2008 | Torsner | H04W 36/02 | 370/331 |
| 2008/0310338 A1* | 12/2008 | Charpenter | H04L 1/1671 | 370/315 |
| 2009/0097444 A1* | 4/2009 | Lohr | H04W 72/14 | 370/329 |
| 2009/0110038 A1 | 4/2009 | Montojo et al. | | |
| 2009/0181689 A1* | 7/2009 | Lee | H04L 5/0044 | 455/450 |
| 2009/0276676 A1* | 11/2009 | Lee | H04L 1/1887 | 714/749 |
| 2011/0002309 A1* | 1/2011 | Park | H04L 1/1607 | 370/335 |
| 2011/0016369 A1* | 1/2011 | Bergman | H04L 1/189 | 714/748 |
| 2011/0069669 A1* | 3/2011 | Dwyer | H04L 1/1614 | 370/329 |
| 2011/0126069 A1 | 5/2011 | Kim et al. | | |
| 2012/0120894 A1* | 5/2012 | Hohne | H04L 1/1861 | 370/329 |
| 2012/0314655 A1* | 12/2012 | Xue | H04L 1/0076 | 370/328 |
| 2013/0114561 A1 | 5/2013 | Simonsson et al. | | |
| 2013/0223501 A1* | 8/2013 | Kalyanasundaram | H04L 1/1829 | 375/227 |
| 2014/0362832 A1* | 12/2014 | Rudolf | H04L 1/1887 | 370/336 |
| 2015/0016430 A1* | 1/2015 | Yuan | H04L 1/1887 | 370/336 |
| 2015/0180617 A1* | 6/2015 | Sun | H04L 1/1861 | 370/329 |
| 2015/0215077 A1* | 7/2015 | Ratasuk | H04B 7/088 | 455/436 |
| 2017/0111160 A1* | 4/2017 | Chen | H04L 1/1812 | |
| 2017/0237529 A1* | 8/2017 | Eriksson | H04L 1/1825 | 714/748 |
| 2017/0331577 A1* | 11/2017 | Parkvall | H04W 4/00 | |
| 2017/0331670 A1* | 11/2017 | Parkvall | H04J 11/0079 | |
| 2018/0152939 A1* | 5/2018 | Lee | H04W 72/0413 | |

* cited by examiner

METHOD AND DEVICES EMPLOYING RETRANSMISSION SCHEMES

TECHNICAL FIELD

The present invention relates generally to methods and devices in communications systems in which automated repeat requests are used. Particularly, it relates to a method of performing a feedback process between a network access node and a communication terminal, and a network access node being adapted to perform this method, as well as an according communication terminal.

BACKGROUND

In current wireless communication systems, like e.g. LTE as standardized by 3GPP, mechanisms exist to increase the reliability of transmissions over the air interface. Typically, an Automatic Repeat Request (ARQ) mechanism, e.g. a Hybrid Automatic Repeat Request (HARQ) mechanism, is employed at the link layer to increase the spectral efficiency of the system. Such a mechanism uses feedback messages (acknowledgements) sent from the data receiver to the data sender in order to trigger retransmissions if the previous transmission failed. Incremental Redundancy and Chase Combining are two typical strategies to combat such transmission errors.

FIG. 1 shows part of the LTE eUTRAN protocol stack used in communication between a radio base station (BS) 10, in LTE also named eNB, and a terminal device (UE) 12, together with the retransmission protocols employed at the Radio Link Control (RLC) and Medium Access Control (MAC) layers. The figure depicts the protocol stacks of a base station (BS) 10 and a user terminal (UE) 12, respectively. The stack comprises in each case, from top to bottom, a PDCP (Packet Data Convergence Protocol) layer 14a, 14b, an RLC (Radio Link Control) layer 15a, 15b, a MAC (Medium Access Control) 16a, 16b and a physical layer (PHY) 17a, 17b. As is commonly known, each layer provides certain services for the respective higher layer.

Therein, the PDCP layer 14a, 14b provides transport of its data with ciphering (encryption/decryption) and integrity protection, including header compression, handover control etc. The RLC layer 15a, 15b transports the data units provided by the PDCP layer 14a, 14b and includes the functions of segmentation resp. concatenation, in-order delivery resp. reordering, and error control. Therefore, in the depicted RLC layer 15a, 15b an ARQ protocol 18 is employed. The MAC layer 16a, 16b provides logical channels that are multiplexed into transport channels, handles prioritization and scheduling of these logical channels (for the same UE and between different UEs), and another error control scheme. Herein, a HARQ protocol 19 is employed. Finally, the physical layer 17a, 17b carries the information from the MAC transport channels over the air interface via physical channels.

Current LTE systems comprise three retransmission resp. error control layers, as already indicated above and partly shown in FIG. 1: The PDCP layer 14a, 14b provides packet forwarding upon mobility (i.e. when a UE moves from one base station to another, e.g. via X2) as well as loss-free handover, e.g. retransmission of non-acknowledged PDUs (Protocol Data Units) on the new link after handover. In the RLC layer 15a, 15b, a selective-repeat ARQ scheme is used which is asynchronous and reliable, providing guarantee of delivery, and is thus slower, i.e. may require more time for each feedback loop. Then, in the MAC layer 16a, 16b, a HARQ scheme based on a stop-and-wait ARQ protocol is used which allows soft-combining, i.e. several transmissions of a data unit may be combined in order to reconstruct the correct contents. In the downlink direction, asynchronous retransmissions and synchronous feedback are used, while in the uplink direction both retransmissions and feedback are synchronous. In the MAC layer, there is no guarantee of delivery of a data unit, and the feedback is also not fully reliable.

As the described current HARQ protocol of LTE is not 100% reliable, the higher layer RLC AM (acknowledged mode) is required to ensure reliability, which adds overhead and complexity. Also, the current HARQ protocol is based on several strict timing relations (such as e.g. as per synchronous HARQ timing operation), which is very inflexible and may cause problems when e.g. operating using Dynamic TDD (Time Division Duplex).

SUMMARY

It is therefore an object of the present invention to provide a mechanism for improving hybrid ARQ (HARQ) feedback procedures, particularly in respect of reliability, flexibility and speed.

According to a first aspect, there is provided a method for controlling a feedback process in a communication between nodes of a communication system, comprising selectively employing one or both of a first feedback process which provides fast feedback and a second feedback process which provides reliable feedback, wherein the first and second feedback processes operate at least partly on the same transmission buffers or queues.

According to a second aspect, there is provided a network access node of a wireless communication system, being capable of controlling a feedback process in a communication with a communication terminal, said controlling of a feedback process comprising selectively employing one or both of a first feedback process which provides fast feedback and a second feedback process which provides reliable feedback in communication with said communication terminal.

According to a third aspect, there is provided a communication terminal, being capable of controlling a feedback process in a communication with a network access node of a wireless communication system, said controlling of a feedback process comprising selectively employing one or both of a first feedback process which provides fast feedback and a second feedback process which provides reliable feedback in communication with said network access node.

According to a fourth aspect, there is provided a computer program comprising code which, when executed on one or more processors, causes the one or more processors to operate according to the herein-described method.

DETAILED DESCRIPTION

Figure 1:
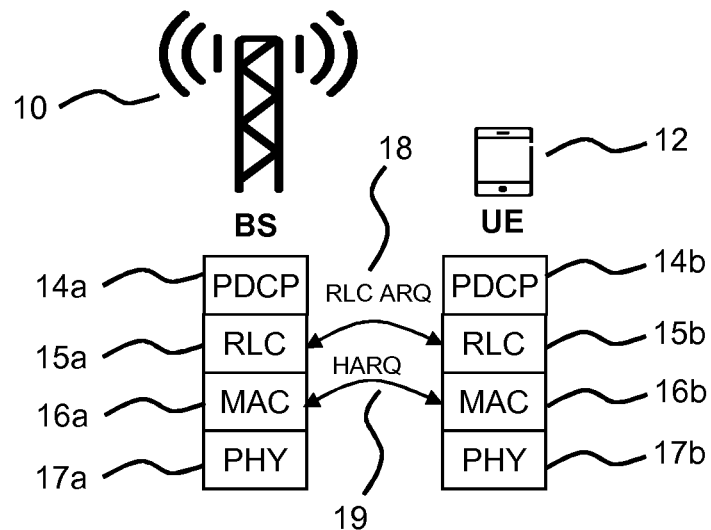
FIG. 1 is a schematic diagram illustrating a part of the LTE protocol stack.

It should be noted that although terminology from 3GPP LTE is used in this disclosure to exemplify the invention, this should not be seen as limiting the scope of the invention to only the aforementioned system. Other wireless systems, including WCDMA, WiMax, WiFi resp. WLAN, UMB and GSM, may also benefit from exploiting the ideas covered within this disclosure. Particularly advantageous may be an application in future 5G networks.

In the context of this disclosure, the term network access node and particularly (radio) base station refers to a node of a radio access network that is used as interface between land-based transport links and radio based transport links, wherein the radio based transport link interfaces directly a communication terminal. The base station may thus be a radio access network node of a wireless communication network according to any wireless communication standard, for example WiFi, LTE, or any future communication standard like 5G. For example, in a GSM/2G access network a radio base station refers to a BTS, in a WCDMA/3G access network a radio base station refers to a NodeB, and in a LTE access network a radio base station refers to an eNodeB. In a WLAN/Wi-Fi architecture a radio base station refers to an Access Point (AP).

Within the context of this disclosure, the term communication terminal may denote any device intended for accessing services via an access network and configured to communicate over the access network. For instance, the communication terminal may be, but is not limited to: a mobile terminal like a UE or mobile phone, smart phone, an MTC (machine type communication) device like a sensor device, meter, vehicle, household appliance, medical appliance or the like, a media player, camera, or any type of consumer electronic, for instance, but not limited to, television, radio, lighting arrangement, tablet computer, laptop, or PC. The communication terminal may be a portable, pocket-storable, hand-held, computer-comprised, or vehicle-mounted mobile device, enabled to communicate voice and/or data, via a wireless or wireline connection. The communication terminal may comprise a cellular data modem or a wireline data modem, or a network interface controller. It may be capable of operating according to any of the aforementioned communication standards.

Within the context of this disclosure, the term data unit may refer to any type of data unit transferred between a first and second communication partner, resp. corresponding protocol layers (in this case also denoted protocol data unit, PDU), or within one communication partner between different layers of the protocol stack (in this case also denoted service data unit, SDU). Generally, any such data unit may also be referred to as a (data) packet.

According to a first aspect of the present invention, there is provided a method for controlling a feedback process in a communication between nodes of a communication system, comprising selectively employing one or both of a first feedback process which provides fast feedback and a second feedback which provides reliable feedback, wherein the first and second feedback processes operate at least partly on the same transmission buffers or queues.

Therein, the first and second feedback processes may be of the same type, i.e. having common characteristics, and may particularly be Hybrid Automatic Repeat Request, HARQ, processes. They may particularly be arranged such as to enable soft combining of transmitted resp. retransmitted data units.

The first feedback process may provide for a feedback that is as fast as possible given the constraints of the communication system, and may be not fully reliable, which may be achieved by using short feedback messages. The second feedback process may be more reliable but slower, for example by using a process that allows longer feedback messages. The first feedback process may be a self-contained HARQ feedback process, and the second feedback process may be a scheduled HARQ feedback process.

The first feedback process may contain feedback relating to a single HARQ process and the second feedback process may contain feedback to all HARQ processes. Alternatively the first feedback process may contain feedback to a small sub-set of recently used HARQ processes and the second HARQ process may contain feedback to a larger sub-set of HARQ processes than what is contained in the first feedback process. The first feedback process may contain a small number of HARQ feedback bits (e.g. one or two) and the second feedback process may contain a larger number of bits per HARQ process (e.g. two or more).

The communication system may be a wireless communication system, and the nodes between which the communication takes place may be a network access node, particularly a radio base station and a communication terminal, e.g. a mobile device like a UE.

In the above method, the selectively employing of one or both feedback processes may be done based on the conditions of the transmission channel, and/or the required level of reliability and/or timing constraints. For example, if a low latency is required, the first feedback process may be selected, and if a high reliability is required, the second feedback process may be selected. If both, low latency and high reliability is required, a combination of both feedback processes may be selected. Further, parameters of each feedback process may be adapted in order to meet the respective requirements. For example, if both feedback processes are selected due to latency and reliability requirements, a resource efficient configuration of the second feedback process may be selected. The first feedback may be periodically transmitted using a small semi-statically configured radio resource (e.g. an uplink physical control channel) while the second feedback may be transmitted when the mobile receives a grant on an uplink physical data channel. The grant may contain explicit information on if the second feedback shall be transmitted or not; or the device or network node performing the method may be configured with a standardized rule on when to transmit the second feedback conditioned on that it has a grant; or the device or network node may decide autonomously (e.g. based on the priority of other uplink data and the size of the grant) if a second feedback shall be transmitted or not.

The above selection of whether one or both of the feedback processes is to be employed may be made by a first one of the communication partners, for example by a network access node resp. a radio base station, and an according instruction may be sent to the other, second communication partner, e.g. a communication terminal, in an appropriate message. This may be done in advance for a number of communicated data units, together with a data unit that is transmitted to the second communication partner, or subsequent to a number of transmitted data units. Therein, the way the instructions are sent may be different for the first and second feedback process; e.g. the first communication partner may transmit an instruction to use the first feedback process in advance, and transmit an instruction to use the second feedback process together with a transmitted data unit or subsequent to a number of transmitted data units. These instructions may comprise instructions on whether to apply the respective feedback, and/or instructions how the feedback process is to be performed, e.g. whether immediate feedback is required or not or by indicating when and/or in which message and/or for which transmitted data units feedback is to be given by the second communication partner.

The second communication partner, e.g. the communication terminal, may then return according feedback messages based on these received instructions for the data units received for which the respective instruction is valid. Therein, the second communication partner may still have some freedom to determine when and how to send feedback, e.g. may postpone a feedback message if data transmission or signaling having a higher priority is to be transmitted from the second communication partner to the first communication partner.

According to a second aspect of the present invention, there is provided a network access node, which may particularly be a radio base station, of a wireless communication system, the network access node being capable of controlling a feedback process in a communication with a communication terminal, said controlling of a feedback process comprising selectively employing one or both of a first feedback process which provides fast feedback and a second feedback which provides reliable feedback in communication with said communication terminal.

For communicating with the communication terminal, the network access node may comprise a transmitter and a receiver that is capable of transmitting/receiving data units via/from a communication channel between the network access node and the communication terminal.

The network access node may further comprise one or more processors which is/are capable of controlling said feedback process. This may for example be achieved by loading, from a memory that may or may not be comprised in the network access node, program code to the processor, said program code causing the one or more processors to perform controlling of said feedback process.

Particularly, said network access node may thus be capable of performing the methods described herein.

According to a third aspect of the present invention, there is provided a communication terminal, the communication terminal being capable of controlling a feedback process in a communication with a network access node, particularly a radio base station, of a wireless communication system, said controlling of a feedback process comprising selectively employing one or both of a first feedback process which provides fast feedback and a second feedback which provides reliable feedback in communication with said network access node.

For communicating with the network access node, the communication terminal may comprise a transmitter and receiver that is capable of transmitting/receiving data units via/from a communication channel between the network access node and the communication terminal.

The communication terminal may further comprise one or more processors which is/are capable of controlling said feedback process. This may for example be achieved by loading, from a memory that may or may not be comprised in the communication terminal, program code to the processor, said program code causing the one or more processors to perform controlling of said feedback process.

Particularly, said communication terminal may thus be capable of performing said above-described methods.

According to a fourth aspect of the present invention, there is provided a computer program comprising code which, when executed on one or more processors, causes the one or more processors to operate according to the above methods. The computer program may be carried on any type of volatile or non-volatile, tangible or non-tangible carrier, like an electromagnetic signal, semiconductor memory, magnetic, optical, magneto-optic or any other machine-readable storage media. In one or more embodiments, a non-transitory computer-readable medium stores a computer program comprising program instructions that, when executed by processing circuitry of a communication terminal, configures the communication terminal according to the teachings herein.

By the herein described methods and devices, a flexible HARQ feedback scheme is provided that optimizes transmission with respect to speed and resource efficiency on the one hand and reliability on the other hand.

Figure 2:
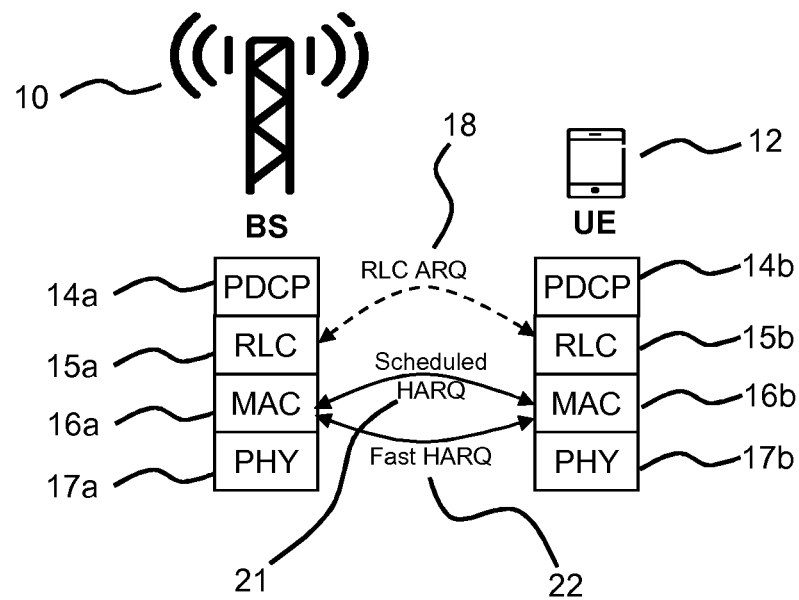
FIG. 2 is another schematic diagram illustrating a part of the LTE protocol stack.

FIG. 2 is a schematic diagram illustrating a part of the LTE protocol stack in which the described retransmission scheme is employed. The general setup is similar to the one described with respect to FIG. 1, i.e. the protocol layers are the same as described above, and accordingly same reference numbers relate to same elements.

As shown in FIG. 2, there are two different feedback processes or schemes employed on the MAC layer 16a, 16b, which in this example are both HARQ processes with differing characteristics. One thereof, corresponding to the first feedback process as mentioned above, is a fast HARQ process 22, particularly a self-contained HARQ feedback process, and the other one, corresponding to the second feedback process as mentioned above, is a scheduled HARQ feedback process 21.

In this context, self-contained HARQ feedback 22 may be implemented such that a subframe may contain a downlink part as well as an uplink part, allowing for e.g. fast HARQ feedback in the uplink of the data transmission just having occurred in the downlink. Hence, the HARQ feedback can be much faster than in the procedure specified for LTE. However it may be less robust, i.e. may not be fully reliable depending on the circumstances of the transmission channel, for example quality of the radio link.

Scheduled HARQ feedback 21 is, in the context of this disclosure, a multi-bit HARQ feedback, typically scheduled on the data channel. This allows for larger feedback messages and hence the feedback of multiple HARQ processes. This may be made more robust and is quite flexible since being scheduled, but will hence not be as fast as the Self-contained HARQ-feedback from the previous section.

Depending on the circumstances, e.g. radio link quality, these procedures may be configured and it may be determined whether both or only one of them shall be used. Thereby, one or both of these feedback processes may be employed selectively. As a result, there is provided a dual-layer HARQ feedback scheme which can be flexibly adapted and is as fast and/or reliable as is required for any given scenario, e.g. in the context of a 5G radio network.

Through the Fast HARQ feedback component 22, exemplified by the self-contained HARQ process, as fast-as-possible retransmissions are enabled, allowing e.g. for a more aggressive link adaptation and hence better spectral efficiency. Through the scheduled HARQ feedback component 21, efficient, near-100% robust, HARQ feedback is provided suitable in e.g. Dynamic TDD scenarios.

It may be foreseen that in a communication between a network access node, particularly a radio base station, and a communication terminal resp. UE, the network access node configures the UE to send fast HARQ feedback after every DL transmission. This may e.g. be done explicitly by providing a feedback resource in the DL grant, semi-persistently by configuring the UE with an uplink control channel, or implicitly by defining a rule (e.g. the UE that receives the third grant on the DL control channel implicitly gets the third feedback resource). Thereby, a first feedback process providing for fast feedback can be selected and configured. In addition or alternatively, the network access node may request detailed HARQ feedback (i.e. polled feedback), for example by setting a bit in the UL grant. Doing this in the UL grant is also one example how it can be defined when the feedback shall be given, namely in the granted UL slot. In the feedback request, the network access node may also indicate for which transmitted data units feedback is requested, e.g. based on sequence numbers of the data units. Thereby, a second feedback process, being somewhat slower than the first feedback process but more reliable, can be selected and configured.

Nevertheless, there may be alternatives for how and when the second process feedback is transmitted. The UE may still make a decision how and/or when to transmit the feedback, e.g. based on the size of the grant and the priority of the UL data that it could transmit instead of the second HARQ feedback.

Due to the achieved speed and reliability, there may be no need for a separate feedback process on a higher protocol layer, like the RLC ARQ 18 on the RLC layer. Thus the RLC ARQ 18 in FIG. 2 may be abandoned, thereby reducing complexity. However it is conceivable that such further feedback process, like RLC ARQ 18, is nevertheless employed in order to further increase reliability resp. robustness. This may for example be used for mobility scenarios and/or situations where extreme levels of robustness may be needed.

In the following, the above procedures will be exemplarily explained in more detail. In this exemplification, data is being transmitted from a network access node, like a (radio) base station (i.e. from the network side) to the communication terminal (UE), i.e. in the downlink (DL), whereas the feedback information is sent from the communication terminal to the base station, i.e. the transmission of feedback messages, e.g. in an HARQ process, takes place in the uplink (UL). The following description focuses on this scenario, thereby assuming that the scheduling logic resides in the network, for example in the base station.

It is however noted that the same procedure may principally be used also for UL data transmissions. This may e.g. be foreseen in scenarios employing Semi-Persistent Scheduling (SPS) and/or if Unscheduled/Contention-Based UL access is used, in which case (H)ARQ feedback is needed also for UL data transmissions.

Now turning to the first and second feedback processes as mentioned above, they will in the following be explained in the examples of a Fast HARQ feedback and a Scheduled HARQ feedback.

The Fast HARQ Feedback is a lean feedback, e.g. using only a single bit, and thus not very robust. It is intended to be sent by the communication terminal resp. UE as soon as possible after an Rx (Reception) attempt.

Robustness in this context relates to how prone to errors a feedback process is. For example, if a UE sends a single bit NACK (negative acknowledge) this may be incorrectly detected as an ACK (positive acknowledgement). If this happens the data unit will be considered as correctly delivered by the base station and it will be deleted from the transmit buffer. After such a feedback error event (NACK→ACK) the UE cannot re-transmit the feedback again and get a re-transmission of the missed or incorrectly received data unit.

In some embodiments, the feedback is dynamically scheduled by a detailed transmission grant included in Downlink Control Information (DCI) sent by the network access node resp. radio base station together with the transmitted data for which feedback is requested. In some other embodiments, the feedback is always transmitted after one or more Rx attempts on predefined semi-statically allocated resources, as configured by higher layer signaling (e.g. RRC). In yet some other embodiments, being a combination of the other two embodiments in this paragraph, the resources for feedback transmission are semi-statically configured by e.g. RRC, but the actual triggering of the feedback transmission is done dynamically by e.g. a small flag in the DCI or a MAC control element.

Figure 3A:
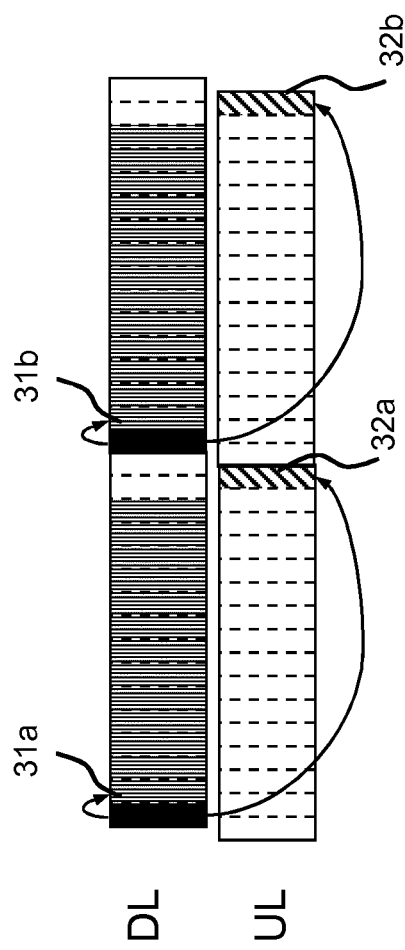
FIGS. 3a and 3b depict examples for a fast HARQ feedback scheme.

In some embodiments the feedback covers the transmission of data from one downlink Rx (reception) attempt resp. transmitted data unit, as depicted in FIG. 3a. Therein, each feedback transmission 32a, 32b relates to one DL transmission 31a, 31b. This may for example be used for FDD scenarios or for small TDD cells.

Figure 3B:
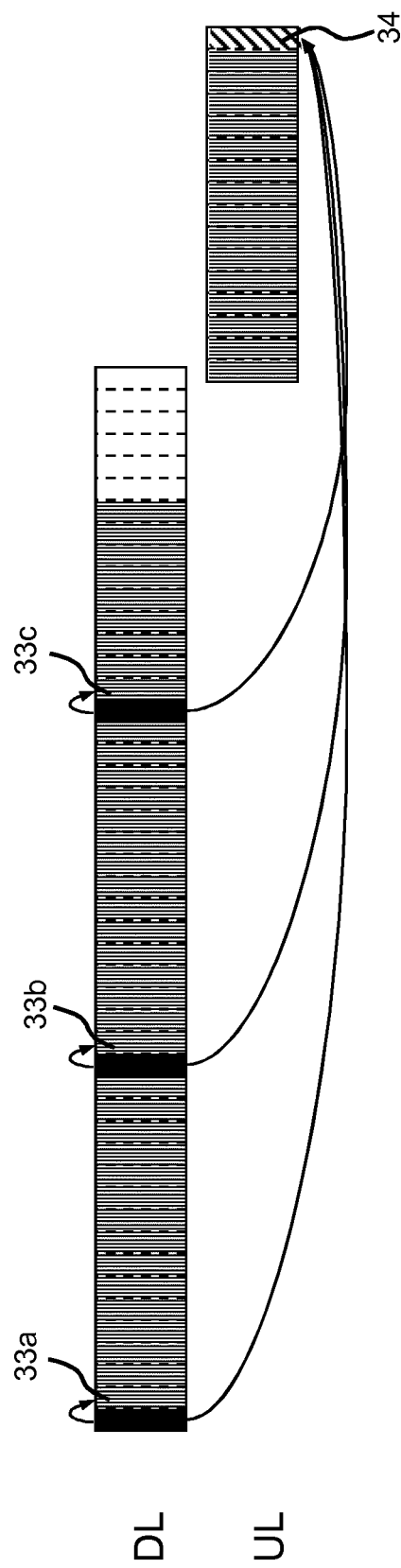

In some other embodiments, feedback regarding multiple Rx attempts and/or transmitted data units are aggregated together in one transmission as depicted in FIG. 3b. In this example, there is one feedback transmission 34 which contains feedback for several reception attempts resp. received data units 33a, 33b, 33c. This may for example be used for half-duplex FDD scenarios or large TDD cells.

The reason for distinguishing between these cases is that in the latter case, the cost of switching between Reception and Transmission are deemed higher than in the former case. The number of Rx attempts to cover by the feedback message can e.g. be configured a priori via RRC or dynamically in the DCI.

In some embodiments, the feedback is sent after completion of decoding of the received data, and hence indicates whether the data has been successfully decoded or not. In some other embodiments, the feedback is sent before completion of decoding of the received data, and instead indicates the estimated probability if the data is likely to be successfully decoded or not. This estimation could e.g. be based on the estimated Signal-to-Interference and Noise-Ratio (SINR) for the reception and/or the amount of soft information accumulated. This estimation accuracy need not be significantly better than the feedback error probability.

In some embodiments, the feedback is in the form of a typical Ack/Nack indicating successful or unsuccessful decoding of the received data. In some other embodiments, the feedback is rather a soft quality measure such as e.g. the accumulated amount of soft information bits, the effective SINR etc.

In some embodiments, a differentiation is made in the feedback reporting between the cases where successful decoding of the data was not possible (i.e. data channel error) and when no data reception attempt was attempted since the corresponding DL assignment failed (i.e. control channel error).

Upon receiving this feedback, the NW resp. base station should act on the fed-back information by e.g. either—in case of a (probably) unsuccessful decoding—retransmitting the same data on the same HARQ process or—in case of a (probably) successful decoding—transmitting new data on another (or possibly the same) HARQ process.

Figure 4:
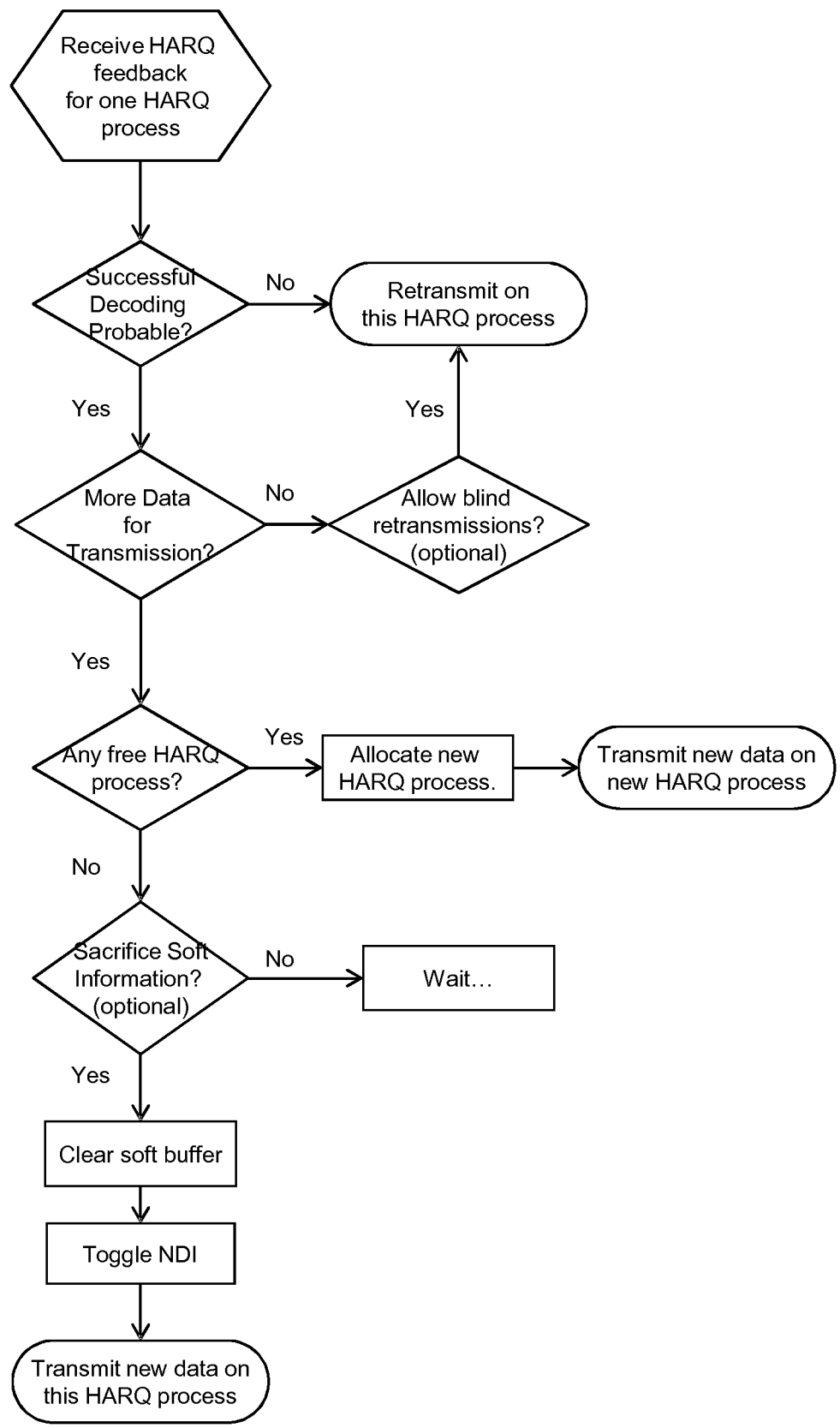
FIG. 4 is a flowchart showing actions performed in a HARQ process.

One exemplification of the NW resp. base station action on the received HARQ feedback is shown in FIG. 4. This flowchart shows the actions taken by the network side, e.g. the base station, when a feedback message from the communication terminal is received. Of course such procedure is generally also applicable for the second feedback process.

The second feedback process is in this example a scheduled, more reliable HARQ feedback, for example a multi-bit HARQ feedback scheduled on the data channel. It provides a good, simple design which for e.g. dynamic TDD scenarios where it is required that the protocols can handle dynamic and possibly varying timing relations. Being able to convey many bits of information, this feedback can be rather extensive and hence is may be advised to ensure that the base-station beam-former is pointing towards the UE when transmitting to ensure as favorable link-budget as possible. This also alleviates the need for "special purpose UL control channels" since being dynamically and explicitly scheduled, creating a large flexibility in its usage and hence a more future-proof design. It further provides robustness e.g. by means of being CRC protected and also by including built-in error mitigation techniques as described below.

Being a scheduled feedback, the NW will send an UCI grant to the UE indicating which, or at least the number of, HARQ processes that should be reported in the feedback. This UCI grant will also indicate the explicit resources on which this transmission shall take place—unless of course this has already been assigned via RRC, in which case the UCI grant need not contain such detailed information.

In some embodiments, the report will be full size, covering all the allocated HARQ processes for this UE in the DL direction. In some other embodiment, a smaller report will be sent, which covers only parts of the allocated HARQ process. In yet another embodiment, a differential report will be sent wherein e.g. the status is reported for HARQ processes not having been reported in the last sent reports. Which of these reporting types are used, can be either configured via RRC or explicitly indicated in the received UCI grant.

Figure 5:
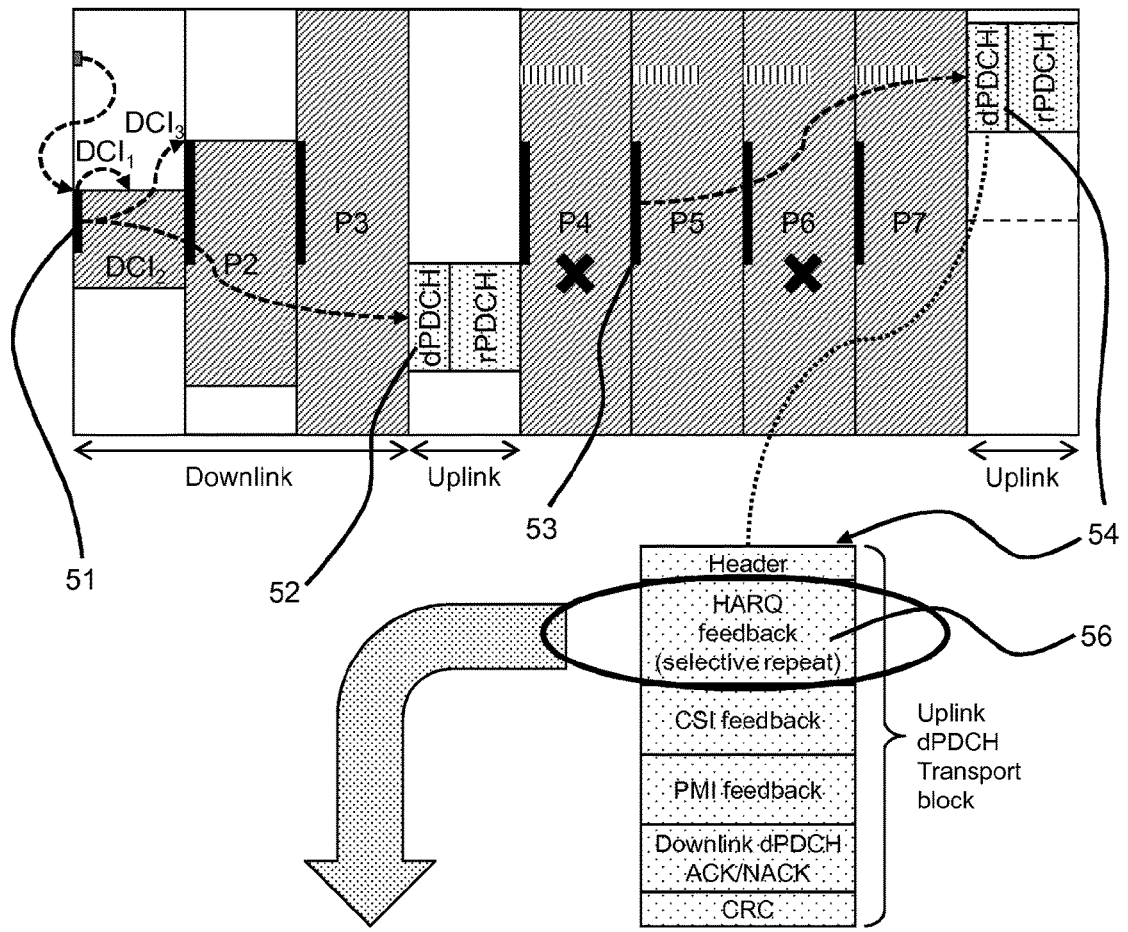
FIG. 5 is an example for a scheduled HARQ feedback scheme.
Figure 5:
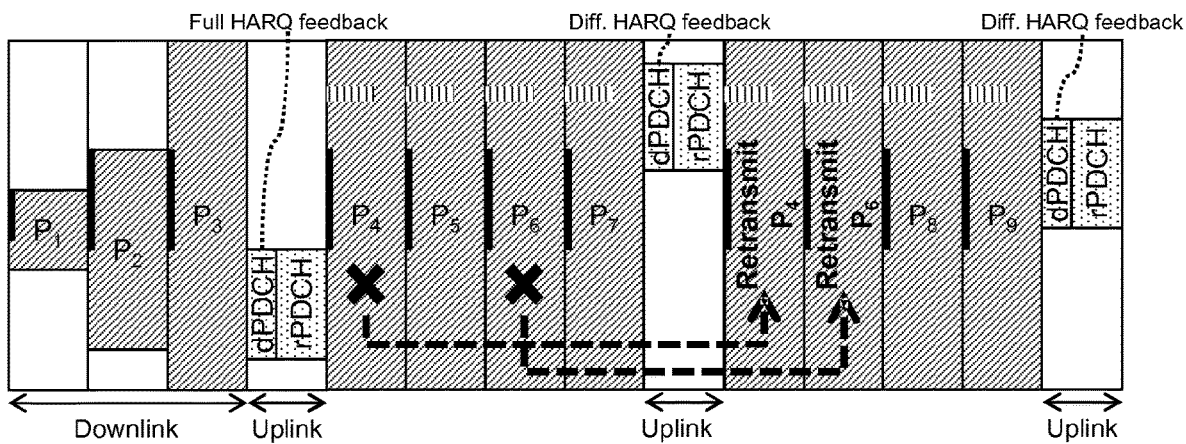

An exemplification of the procedure is shown in FIG. 5, wherein the definition resp. instruction on how the feedback is to be performed is depicted in FIG. 5 top, whereas details on the possible response to the feedback message contents are illustrated in FIG. 5 bottom. In this example, a DCI (Downlink Control Information) message 51 contains instructions defining a transport block 52 on an uplink dedicated physical data channel (dPCDH) in which feedback is to be transmitted (i.e. from a UE to a base station). DCI message 51 may also contain information regarding the type of feedback that is requested, e.g. whether a fast HARQ or a scheduled HARQ, or both, is requested. The according transport block 52, shown in FIG. 5 in the middle, then contains HARQ feedback information, for example according to a selective repeat scheme. The same applies for DCI message 53 and transport block 54 containing HARQ information.

The structure and contents of transport block 54 are shown in FIG. 5 in the middle, particularly depicting a HARQ feedback section 56, which in this example is according to a selective repeat scheme and indicates that DL packets P4 and P6 were incorrectly or not received. Based on this feedback, in a downlink transmission not or incorrectly received data packets (here packets P4 and P6) are retransmitted in the downlink. Of course this is only one example of how these messages may look, there may be other ways to implement this type of feedback.

Figure 6:
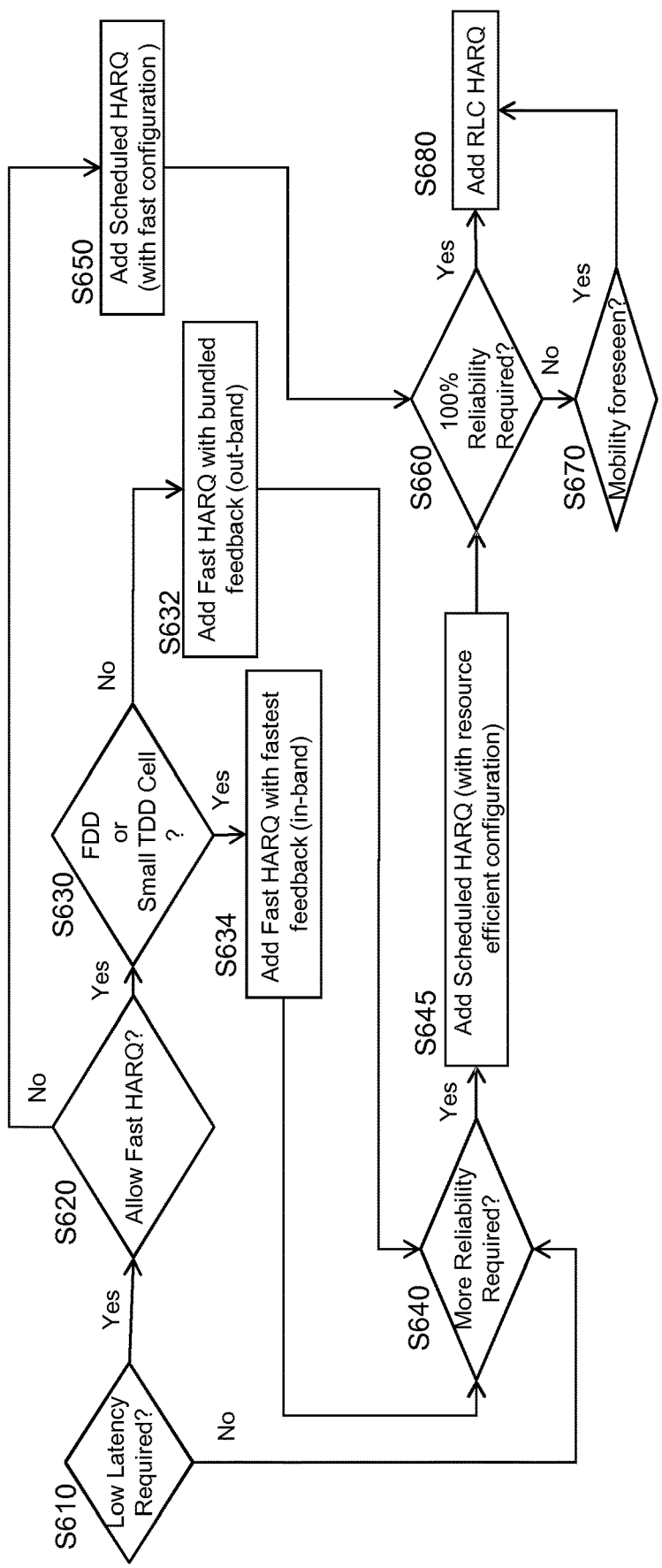
FIG. 6 is a flowchart showing configuration of a HARQ feedback scheme.

A procedure for configuring the above-described feedback process, i.e. for selecting which type(s) of feedback process shall be used, is shown in FIG. 6. Therein, based on certain circumstances like timing and/or reliability constraints, network configuration and the like, feedback processes to be used in communication between a network access node, particularly a radio base station, and a communication terminal are selected. Possible feedback processes therein are a fast HARQ process, a scheduled HARQ process, both of which are described above, and optionally an RLC ARQ process.

In this exemplary flowchart, if it is determined in step S610 that a low latency is required in step S620 that use of a fast HARQ process is possible or allowed, then the network configuration is checked in step S630. If the network operates in FDD mode or in a small FDD cell, a fast HARQ process with fastest possible feedback, e.g. in-band feedback, is selected in step S634. Otherwise, a fast HARQ process with bundled feedback, e.g. out-band feedback, is selected in step S632. Hereafter, it is checked in step S640 whether a high degree of reliability is required which cannot be met by the selected fast HARQ feedback. If yes, a scheduled HARQ feedback process is added in step S645, preferably in a resource efficient configuration. The latter also is selected in step S645 if there is no low latency required as determined in step S610 and it is determined in step S640 that high reliability is required.

If it is determined in step S610 that a low latency is required and use of a fast HARQ process is not possible or allowed according to step S620, a scheduled HARQ process is selected in step S650, preferably in a fast configuration, e.g. every TTI (transmission time interval).

Following the described selections, it may optionally be checked in step S660 whether 100% reliability is required and/or in step S670 whether mobility of communication terminals is foreseen. If one of these conditions is met, a further ARQ process on the RLC layer may be used and added in step S680.

This procedure may be performed by a radio network node, e.g. a radio base station like an eNodeB, or a control node or entity in or assigned to the radio access network. It may of course also be performed in a virtualized or distributed manner.

As a result, according signaling may be given to the network entities involved in the communication, particularly to the user terminal and possibly also to the radio base station if the procedure is not performed by the radio base station itself. For example, the user terminal may be informed on the feedback schemes that are to be employed during the set-up of a communication or during an ongoing communication.

The above-described concept is thus based on having two separate HARQ feedback mechanisms with distinct characteristics of e.g. fast/lightweight/non-reliable vs. slower/more robust/reliable, where both these mechanisms are used simultaneously resp. selectively and dynamically configured.

Figure 7:
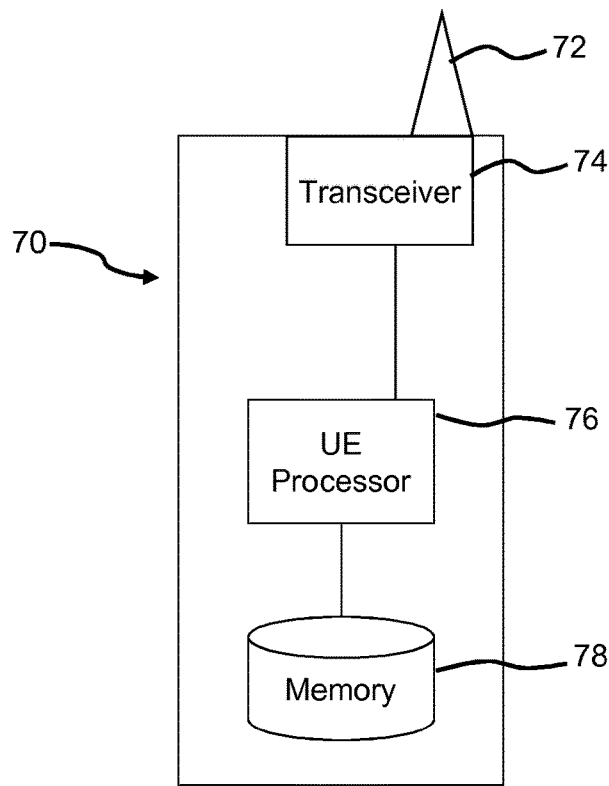
FIG. 7 shows an example for a communication terminal.

FIG. 7 provides a schematic diagram of a communication terminal 70, here denoted UE, which may be used in the context of this disclosure, and may be an example for the above-described communication terminal. The UE 70 comprises a transceiver 74 capable of communicating with a base station of a wireless communication network, connected to an antenna 72 and a processor 76. The UE further comprises a memory 78 that, in one or more embodiments, stores computer program instructions to be executed by the processor 76.

Figure 8:
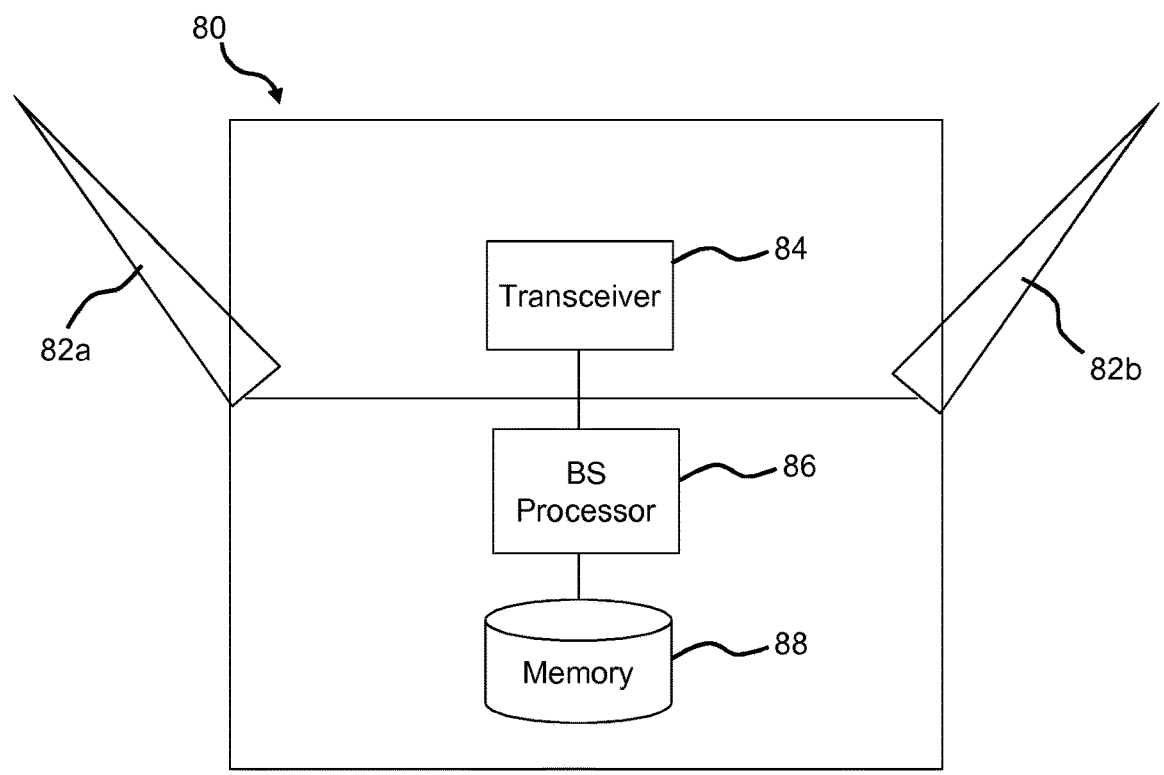
FIG. 8 shows an example for a radio bases station.

FIG. 8 provides a schematic diagram of a base station 80 that may be used in the context of this disclosure, and may be an example for the above-described base station. The base station 80 comprises a transceiver 84 capable of communicating with communication terminals such as the ones described above, the transceiver 84 being connected to an antenna—or, in the present example, to a pair of antennas 82*a*, 82*b*—, and a processor 86. In the shown example, the base station 80 comprises two antennas 82*a*, 82*b*, which may be foreseen e.g. in order to allow beamforming. However, the base station 80 may include a single antenna, or may include more than two antennas. The base station 80 further comprises a memory 88 that in one or more embodiments stores instructions for execution by the processor 86.

In both the communication terminal 70 of FIG. 7 and the base station 80 of FIG. 8, the processor 76, 86 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other components of the communication terminal 70 resp. base station 80, such as the memory 78 resp. 88, functionality to perform the above-described methods. The memory 78 resp. 88 may comprise non-transitory machine-readable storage media (also called computer-readable media) having stored therein software. For instance, the memory 78 resp. 88 may comprise non-volatile memory containing code to be executed by the processor 76 resp. 86. Because the memory 78 resp. 88 is non-volatile, the code and/or data stored therein can persist even when the communication terminal 70 resp. base station 80 is turned off (when power is removed). In some instances, while the communication terminal 70 resp. base station 80 is turned on that part of the code that is to be executed by the processor(s) 76 resp. 86 may be copied from non-volatile memory into volatile memory (e.g., dynamic random access memory (DRAM), static random access memory (SRAM)) of the communication terminal resp. base station.

Figure 9:
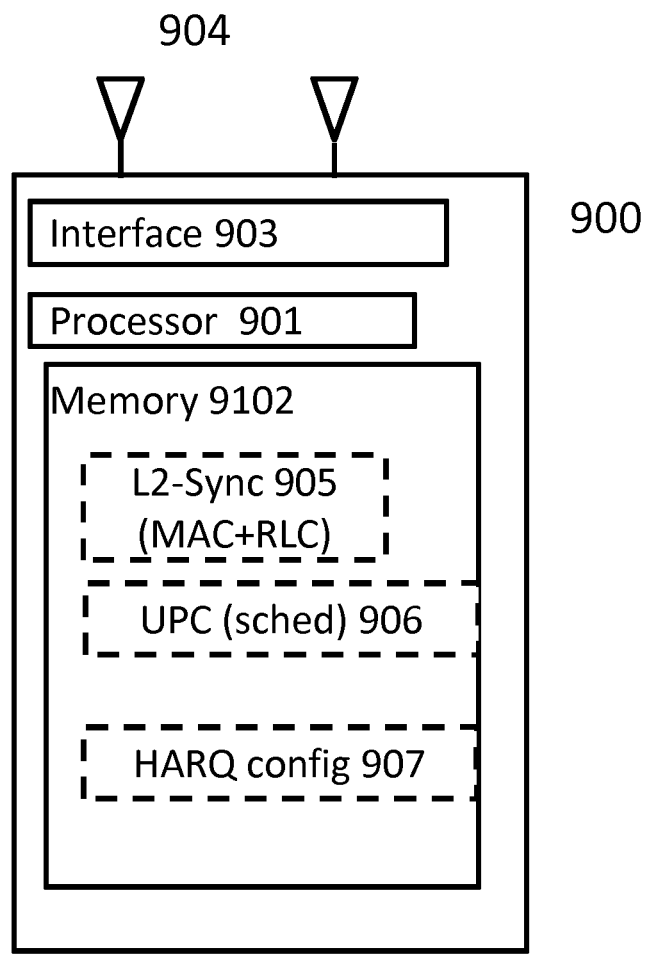
FIG. 9 shows an example for a network device.

FIG. 9 shows a network device 900 which may be used in the context of this disclosure, and may take over part of or full functionality of the above-described base station, and may thus be used to perform the above-described methods.

Herein, network device 900 may include radio access features that provide wireless radio network access to other electronic devices such as communication terminals as mentioned above. For example, network device 900 may be an eNodeB in LTE or other type of base station as well as a radio network controller. Network device 900 may store and transmit (internally and/or with other electronic devices over a network) code (which is composed of software instructions and which is sometimes referred to as computer program code or a computer program) and/or data using non-transitory machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). As depicted, network device 900 comprises processor 901, memory 902, interface 903, and antenna(s) 904. These components may work together to provide various network device functionality as may be disclosed herein. Such functionality may include implementing all, or a portion, of the modules depicted in FIG. 9.

The components of network device 900 are depicted as single boxes located within a single larger box for reasons of simplicity in describing certain aspects and features disclosed herein. In practice however, network device 900 may comprises multiple different physical components that make up a single illustrated component (e.g., interface 903 may comprise terminals for coupling wires for a wired connection and/or a radio transceiver for a wireless connection). As another example, network device 900 may be a virtual network device in which multiple different physically separate components interact to provide the functionality of network device 900 (e.g., processor 901 may comprise three separate processors located in three separate enclosures, where each processor is responsible for a different function for a particular instance of radio access network device 900). Alternatively, the same physical components may be used to implement multiple separate instances of the network device (e.g., processor 901 may execute separate instructions for multiple different instances of a radio access network device like a base station). Similarly, network device 900 may be composed of multiple physically separate components (e.g., a NodeB component and a RNC component, a BTS component and a BSC component, etc.), which may each have their own respective processor, storage, and interface components. These components may be dedicated components or they may be shared in a virtualized context. In certain scenarios in which network device 900 comprises multiple separate components (e.g., BTS and BSC components), one or more of the separate components may be shared among several network devices. For example, a single RNC may control multiple NodeBs. In such a scenario, each unique NodeB and BSC pair may be considered a separate network device. In some embodiments, network device 900 may be configured such that some components may be duplicated (e.g., separate memory 902 for different virtual instances) and some components may be reused (e.g., the same antenna(s) 904 may be shared by any and all virtual instances).

Processor 901 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network device 900 components, such as memory 902.

Memory 902 may comprise non-transitory machine-readable storage media (also called computer-readable media) having stored therein software. For instance, memory 902 may comprise non-volatile memory containing code to be executed by processor 901. Because memory 902 is non-volatile, the code and/or data stored therein can persist even when the network device is turned off (when power is removed). In some instances, while the network device is turned on that part of the code that is to be executed by the processor(s) may be copied from non-volatile memory into volatile memory (e.g., dynamic random access memory (DRAM), static random access memory (SRAM)) of that network device.

Interface 903 may be used in the wired or wireless communication of signaling and/or data to or from network device 900. For example, interface 903 may perform any formatting, coding, or translating that may be needed to allow network device 900 to send and receive data whether over a wired or a wireless connection. In some embodiments, interface 903 may be coupled to the one or more antennas 904 which may include one or more transceivers for communicating with other similar network devices, with end user equipment, like communication terminals, and with other network devices. In some embodiments, interface 903 may comprise radio circuitry that may receive digital data that is to be sent out to other network devices via a wireless connection. The radio circuitry may convert the digital data into a radio signal having the appropriate parameters (e.g., frequency, timing, channel, bandwidth, etc.). The radio signal may then be transmitted via antenna(s) 904 to the appropriate recipient(s).

The L2-Sync module 905 comprises the synchronous parts of layer 2 of the protocol stack. The L2-Sync module 905 comprises 3GPP sub-layers Medium Access Control (MAC) (including Hybrid Automatic Repeat Request (HARQ)) and Radio Link Control (RLC). The MAC sub-layer may have a separate HARQ entity for each connected UE, and a few additional HARQ entities for common needs such as system information, paging, and random access response. The RLC sub-layer may have a separate RLC entity for each logical channel, corresponding to radio bearers. Downlink and uplink may operate independently of each other, with some signaling forwarded from the uplink to the downlink. A task of the L2-Sync module in downlink may be to take Packet Data Convergence Protocol (PDCP) Packet Data Units (PDUs) from a PDCP PDU buffer and build MAC PDUs that are sent to the L1 module. This may be triggered by a transmit order from User Plane Control (UPC) module. In downlink the L2-Sync module may also handle multiplexing of logical channels, HARQ retransmissions, MAC control elements, MAC procedures such as random access, RLC PDU buffering and retransmissions, and RLC status messages. A task of the L2-Sync module in uplink may be to deconstruct MAC PDUs received from the physical layer into PDCP PDUs that are delivered to a higher layer. In uplink the L2-Sync module 905 may also handle MAC control elements, MAC procedures such as random access, demultiplexing of logical channels, RLC PDU buffering, reordering and retransmissions, and RLC status messages.

The UPC (User Plane Control) 906 comprises fast radio resource management (RRM) functions that may occur on a per-subframe basis. This may include air-interface resource scheduling, link adaptation (transport format selection), and power control. The UPC module may use input from other modules such as the L2-Sync module, and generate messages to other modules such as the L2-Sync module. The input may include buffer status reports, measurement reports, Channel Quality Indicator (CQI) reports, and HARQ feedback. The messages may be control information sent to the UEs, as well as uplink and downlink scheduling commands sent to the physical layer and the L2-Sync module. The UPC module may thus handle scheduling and optimization problems, involving many UEs and shared resources such as spectrum, power, and hardware.

The HARQ configuration module 907 comprises functions for determining which type(s) of feedback processes, specifically HARQ processes, are to be used and for configuring those. This may include selecting one or both of a first feedback process which provides fast feedback and a second feedback which provides reliable feedback, wherein the first and second feedback processes operate at least partly on the same transmission buffers or queues. The first feedback process may particularly be a fast HARQ process and the second feedback process a scheduled HARQ process as described above.

Abbreviations Used in this Document:
5G Fifth-Generation Mobile Radio Access
ACK Acknowledgement
ARQ Automatic Repeat reQuest
CRC Cyclic Redundancy Check
DCI Downlink Control Information
DL Downlink
FDD Frequency Division Duplex
HARQ Hybrid ARQ
LTE Long Term Evolution
MAC Medium Access Control
NACK Negative Acknowledgement
NW Network
PDCP Packet Data Convergence Protocol
(R)BS (Radio) Base Station
RLC Radio Link Control
RRC Radio Resource Control
ReTx Retransmission
Rx Reception
Tx Transmission
TDD Time Division Duplex
UCI Uplink Control Information
UE User Equipment
UL Uplink

The invention claimed is:

1. A method for controlling Hybrid Automatic Repeat reQuest (HARQ) feedback for communication between nodes of a communication system, comprising:
   evaluating one or more factors, including at least one of conditions of a transmission channel between a first one of the nodes as a transmitter and a second one of the nodes as a receiver, a required level of reliability for the communication between the nodes, or a timing constraint on the communication between the nodes;
   selecting, at the transmitter as a selected HARQ feedback process a first HARQ feedback process or a second HARQ feedback process or a combination of the first and second HARQ feedback processes, in dependence on the evaluating; and
   sending an instruction from the transmitter to the receiver, indicating the selected HARQ feedback process;
   wherein the first HARQ feedback process provides faster feedback than the second HARQ feedback process and the second HARQ feedback process provides more reliable feedback than the first HARQ feedback process, wherein feedback messages in the first HARQ feedback process contain feedback to a smaller number of recently used HARQ processes than feedback messages used in the second HARQ feedback process, and wherein the first and second HARQ feedback processes operate at least partly on the same transmission buffers or queues.

2. The method according to claim 1, wherein the first HARQ feedback process is a self-contained HARQ feedback process, and the second HARQ feedback process is a scheduled HARQ feedback process.

3. The method according to claim 1, wherein the feedback messages in the first HARQ feedback process contain feedback to a single HARQ process that is active for the communication between the nodes, while the feedback messages in the second HARQ feedback process contain feedback to all HARQ processes that are active for the communication between the nodes.

4. The method according to claim 1, wherein the feedback messages in the first HARQ feedback process do not include error-detection bits, whereas the feedback messages the second HARQ feedback process contain error-detection bits.

5. The method according to claim 1, wherein the first HARQ feedback process uses shorter feedback messages than the second HARQ feedback process.

6. The method according to claim 1, wherein feedback messages in the first HARQ feedback process are periodically transmitted using a preconfigured transmission resource.

7. The method according to claim 1, wherein feedback messages in the second HARQ feedback process are transmitted based on a grant indication for an uplink data channel.

8. The method according to claim 7, wherein the grant indication contains explicit information on whether the feedback messages in the second HARQ feedback process shall be transmitted or not.

9. The method according to claim 1, wherein selecting the first HARQ feedback process or the second HARQ feedback process or the combination of the first and second HARQ feedback processes comprises using one of the first and second HARQ feedback processes for certain conditions of the transmission channel, or for certain required levels of reliability, or for certain timing constraints, and using both the first and second HARQ feedback processes for certain other conditions of the transmission channel, or for certain other required levels of reliability, or for certain other timing constraints.

10. The method according to claim 1, wherein the first node is a radio base station of a wireless communication system and the second node is a user equipment of the wireless communication system.

11. The method of claim 1, wherein, when the selected HARQ feedback process is the combination of the first and second HARQ feedback processes, the one or more processors of the communication terminal are configured to send fast HARQ feedback for the first HARQ feedback process on an uplink control channel and send reliable HARQ feedback for the second HARQ feedback process on a granted uplink data channel.

12. A network access node of a wireless communication system configured for controlling Hybrid Automatic Repeat reQuest (HARQ) feedback for communication with a communication terminal, comprising:
  a transceiver configured for transmitting signals to and receiving signals from the communication terminal; and
  one or more processors operatively associated with the transceiver and configured to:
    evaluate one or more factors, including at least one of conditions of a transmission channel between the network access node and the communication terminal, a required level of reliability for the communication between the network access node and the communication terminal, or a timing constraint on the communication between the network access node and the communication terminal;
    select, as a selected HARQ feedback process, a first HARQ feedback process or a second HARQ feedback process or a combination of the first and second HARQ feedback processes, in dependence on the evaluation; and
    send an instruction to the communication terminal, indicating the selected HARQ feedback process;
  wherein the first HARQ feedback process provides faster feedback than the second HARQ feedback process and the second HARQ feedback process provides more reliable feedback than the first HARQ feedback process, wherein feedback messages used in the first HARQ feedback process contain feedback to a smaller number of recently used HARQ processes than feedback messages used in the second HARQ feedback process, and wherein the first and second HARQ feedback processes operate at least partly on the same transmission buffers or queues.

13. The network access node of claim 12, wherein, when the selected HARQ feedback process is the first HARQ feedback process, the one or more processors of the communication terminal are configured to send fast feedback for the first HARQ feedback process on an uplink control channel.

14. A communication terminal configured for sending Hybrid Automatic Repeat reQuest (HARQ) feedback to a network access node of a wireless communication system, communication terminal comprising:
  a transceiver configured for transmitting signals to and receiving signals from the network access node; and
  one or more processors configured to:
    receive instructions from the network access node, indicating a selected HARQ feedback process to be employed by the communication terminal for sending the HARQ feedback, the selected feedback process being a first HARQ feedback process or a second HARQ feedback process or a combination of the first and second HARQ feedback processes; and
    send the HARQ feedback to the network access node according to the selected HARQ feedback process;
  wherein the first HARQ feedback process provides faster feedback than the second HARQ feedback process and the second HARQ feedback process provides more reliable feedback than the first HARQ feedback process, wherein feedback messages used in the first HARQ feedback process contain feedback to a smaller number of recently used HARQ processes than feedback messages used in the second HARQ feedback process, and wherein the first and second HARQ feedback processes operate at least partly on the same transmission buffers or queues.

15. The communication terminal of claim 14, wherein, when the selected HARQ feedback process is the second HARQ feedback process, the one or more processors of the communication terminal are configured to send reliable feedback for the second HARQ feedback process on a granted uplink data channel.

* * * * *